(No Model.) 4 Sheets—Sheet 1.

B. H. COFFEY.
FILTER.

No. 417,384. Patented Dec. 17, 1889.

ATTEST:
Agnes P. Vales
Jacob Mankin

INVENTOR:
Barton H. Coffey,
By his Attorney,
Edward P. Thompson

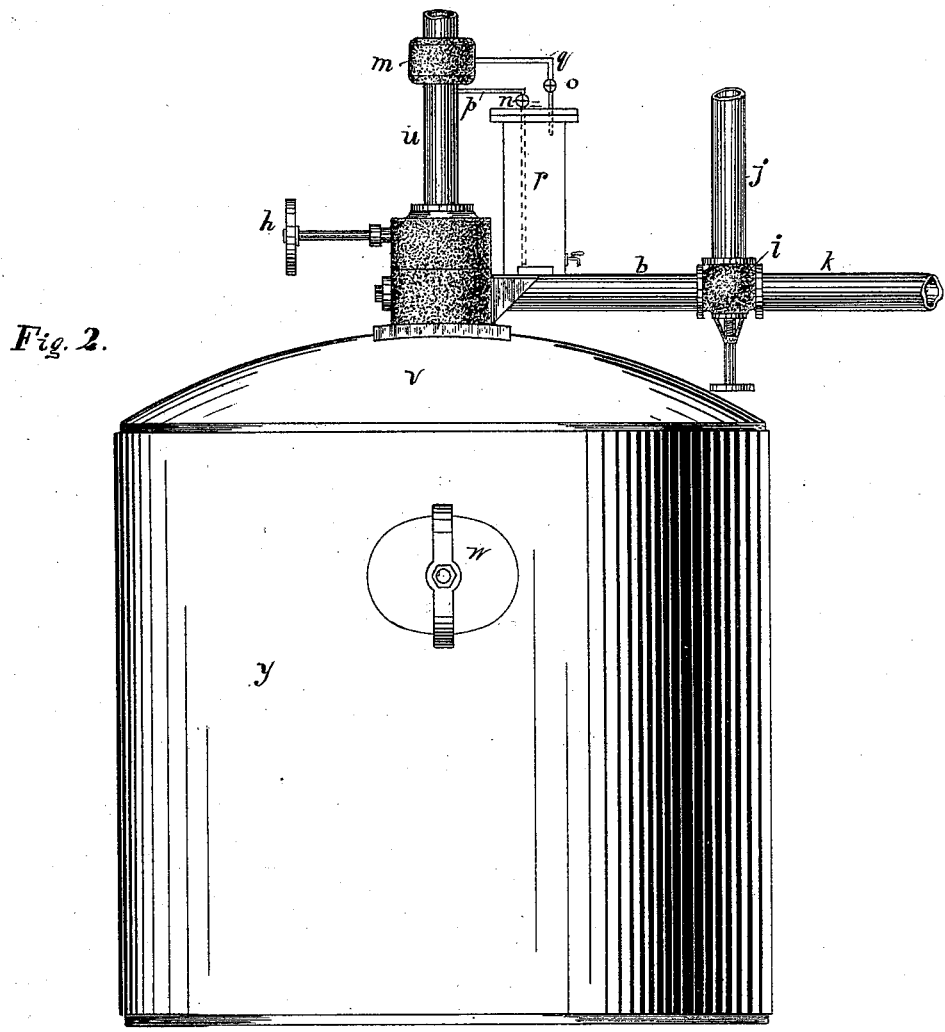

(No Model.) 4 Sheets—Sheet 3.
B. H. COFFEY.
FILTER.

No. 417,384. Patented Dec. 17, 1889.

ATTEST,
George H. Murray
Agnes T. Yates

INVENTOR,
Barton H. Coffey,
By his Attorney,
Edward P. Thompson.

(No Model.) 4 Sheets—Sheet 4.
B. H. COFFEY.
FILTER.

No. 417,384. Patented Dec. 17, 1889.

ATTEST; INVENTOR;

UNITED STATES PATENT OFFICE.

BARTON HAXALL COFFEY, OF PHILADELPHIA, PENNSYLVANIA.

FILTER.

SPECIFICATION forming part of Letters Patent No. 417,384, dated December 17, 1889.

Application filed May 16, 1888. Serial No. 274,044. (No model.)

*To all whom it may concern:*

Be it known that I, BARTON HAXALL COFFEY, of the city and county of Philadelphia, State of Pennsylvania, have invented a new and useful Improvement in Filters, of which the following is a true and exact description, reference being had to the accompanying drawings, which form a part of this specification.

My invention relates to the construction of water-filters of the type known as "closed pressure-filters," in which the water to be filtered is passed through a bed of sand, and which are cleaned by from time to time reversing the course of the water, so as to stir up and wash the sand.

In filters of this kind it is common to use a coagulating device, by which certain impurities held in solution are precipitated before the water is passed through the filter proper; and one portion of my invention consists of an improved coagulator. The chief feature of my invention, however, relates to the devices by which I overcome the difficulties heretofore met with in preventing sand from passing from the filter with the purified water. When this occurs continuously and in large quantity, the filter of course soon loses its efficiency, and even where but a small quantity of sand escapes it is liable to work great injury in a manufacturing establishment.

Much ingenuity has been expended in devising what are called "sand-valves" for preventing the escape of the filtering-sand, and these devices are for the most part the most complicated and expensive parts of the filter, and almost invariably they impede the process of cleaning the filter and make it advisable to use filtered water as the cleansing medium, for the reason that in reversing the current through the valves the water is still, as it were, filtered through them, and any impurities would be retained on the inside of the valve and contaminate the water passing through it when the filter is again in use.

I have discovered that by a proper relative proportioning and construction of the parts of the filter, as hereinafter described, it is practicable to entirely dispense with the usual sand-valve and at the same time secure a more efficient and easily-cleansed filter.

Reference is now had to the drawings which illustrate my invention, and in which—

Figure 1:
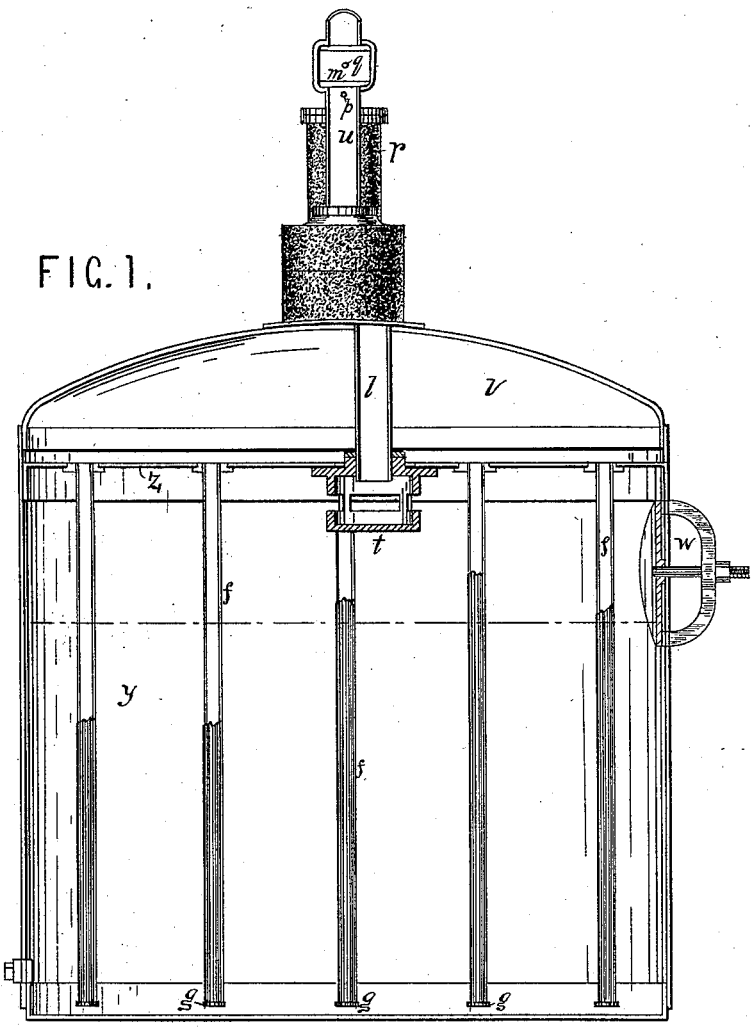
Figure 1A:
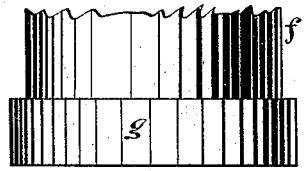
Figures 3, 4:
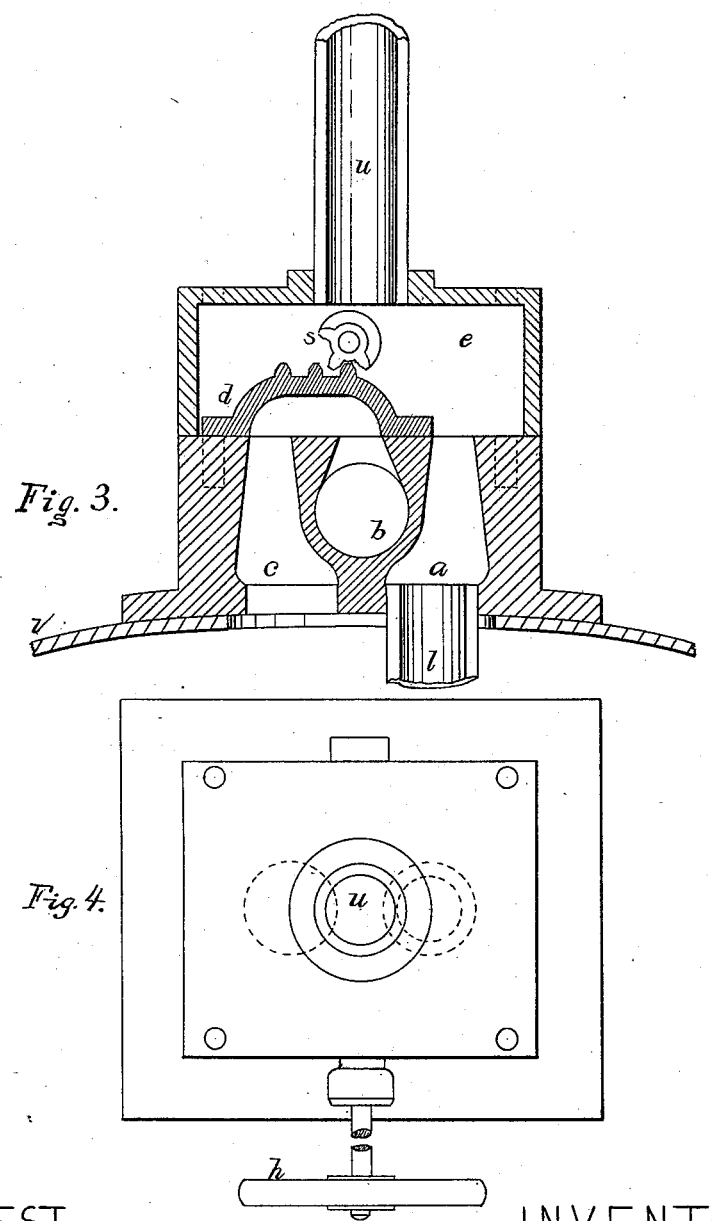
Figure 5:
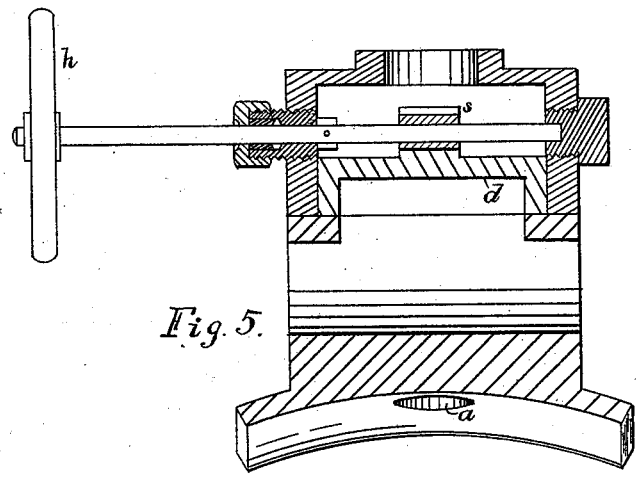

Figure 1 is an elevation, partly in section, of my improved filter. Fig. 1ª is an enlarged view of the bottoms of the tubes. Fig. 2 is an elevation of the filter on a plane at right angles to that of Fig. 1. Fig. 3 is a sectional elevation of the slide-valve for directing the course of the water through the filter. Fig. 4 is a plan view of the parts shown in Fig. 3, and Fig. 5 is a sectional elevation of the parts shown in Figs. 3 and 4 in a plane at right angles to that of Fig. 3.

$v$ and $y$ are respectively upper and lower chambers or compartments divided by a diaphragm $z$, and together constituting the whole of the filtering-vessel.

$f f f$, &c., are pipes secured in perforations in diaphragm $z$, so that their upper ends will open freely into the upper chamber $v$, said upper ends being preferably made flush with the top of diaphragm $z$, as shown, so as not to extend above the bottom of chamber $v$. These pipes $f$ extend down to near the bottom of chamber $y$, and their lower ends open into said chamber through perforations $x\,x$, &c., which may conveniently be formed in caps $g$, formed to screw on the ends of pipes $f$. The perforations $x$, I construct of a size larger than that of the largest particles of sand as a filtering medium. I prefer in the case of ordinary sea-sand to make the perforations of a diameter of three thirty-seconds of an inch, which I have found to give good results, while any size above an eighth of an inch would admit the sand to the filter-pipes freely. These dimensions will be satisfactory in all cases, though of course with particles of greater size the size of the holes could be increased, and I make the pipes $f$ of such aggregate diameter with reference to the water flowing through them that the velocity of the water in each pipe will be sufficient to carry with it any particles of sand which may enter the perforations $x$. As there is no practical drawback in having the velocity of the water much in excess of this requirement, it will require no nice calculations to determine the size and number of the pipes.

$u$ is the supply-pipe; $m$, an enlargement in said pipe.

$r$ is a vessel containing a solution of alum or a similar substance.

$p$ is a pipe connecting the lower part of vessel $r$ with pipe $u$ below the enlargement $m$.

$q$ is a pipe connecting the upper part of vessel $r$ with the enlargement $m$ of pipe $u$.

$n$ and $o$ are regulating-valves in pipes $p$ and $q$.

$e$ is a valve-chamber in which supply-pipe $u$ terminates, and in which is situated the slide-valve $d$, which is conveniently operated by a pinion $s$ and handle $h$, as shown.

$a$, $b$, and $c$ are three ports controlled by valve $d$, the port $a$ leading to the top of chamber $y$ through pipe $l$, on the bottom of which I prefer to secure a deflecting device, such as is indicated at $t$. The port $b$ leads to a valve $i$, which is arranged to connect it at will with the service-pipe $j$ or the drain or wash pipe $k$, and the port $c$ connects with the upper part of chamber $v$.

$w$ indicates a man-hole in the side of chamber $y$, which I call a "filtering-chamber."

The dotted line in Fig. 1 indicates the approximate level of the filtering-sand in chamber $y$, and I would here state that my filter is intended for use with a homogeneous filter-bed, such as sea-sand.

My filter is used in the following manner: The valve $d$ is moved so as to connect ports $b$ and $c$ and open port $a$ to chamber $e$, as in Fig. 1. The water from pipe $u$ will then pass through chamber $e$, port $a$, pipe $l$, and deflector $t$ into the top of chamber $y$. It then passes downward through the sand in chamber $y$ to the bottom of said chamber and enters the bottom of pipes $f$ through the perforations $x$. I have discovered that when these perforations are proportioned as above described some sand will pass through them with the water when first turned on, but that it will soon cease to enter the perforations, the sand packing and presumably arching around the openings, so as to form of itself a sand-valve to prevent the entry of sand into the pipes. The area of pipes $f$ being, as before described, such as to insure a velocity of the water sufficient to carry upward the sand which enters them, the water will carry the sand up to the top of pipes $f$, and when it enters chamber $v$ will deposit the particles of sand upon diaphragm $z$ around the open mouths of pipe $f$, the chamber $v$ serving the purpose of a settling or depositing chamber, from the top of which the purified water passes through ports $c$ and $b$ to valve $i$, through which it is directed first into drain-pipe $k$ until the filter is in full operation, and then into service-pipe $j$.

The operation of the coagulator is as follows, and depends upon the law of hydraulics known as "Bernoulli's theorem," in accordance with which a decrease in the velocity of flow in pipes caused by an increased sectional area is accompanied by an increase in pressure. From this law it follows that, as the velocity of flow in the enlargement $m$ of pipe $u$ is less than in the portion of the pipe below said enlargement, the effect of a flow of water through pipe $u$ will be to establish a current or flow from enlargement $m$ into pipe $q$, thence into vessel $r$, and out of it through pipe $p$ into the pipe $u$. By adjusting the valves $o$ and $n$ the amount of this flow can be nicely regulated and just sufficient alum injected into the water to precipitate such impurities as are coagulated by alum.

To return to the operation of the filter proper, when it is desired to wash or clean the filter, the valve $d$ must be moved so as to cover the ports $a$ and $b$ and open the port $c$ to chamber $e$. The water from the supply-pipe then passes through port $c$ into chamber $v$ and down through pipes $f$ to the bottom of chamber $y$, thence up through the sand to the top of said chamber and out of it through pipe $l$, whence it passes through ports $a$ and $b$ to valve $i$ and is drawn off to drain-pipe $k$. In passing out of chamber $v$ through pipes $f$ a vortex is formed around the mouth of each pipe, and the annular heap of sand deposited around said pipe-mouths is by it drawn into the pipe and is expelled at its bottom through holes $x$ into the mass of sand in chamber $y$.

The device consisting of the filter-chamber adapted to contain sand, in combination with a receptacle for filtering water and communicating orifices of greater diameter than the larger particles of sand, which device is shown and claimed in the present case only in connection with other features of construction, is also my invention, and forms the subject of a claim in my pending application filed April 12, 1889, Serial No. 306,932.

Having now described my invention, what I claim as new, and desire to secure by Letters Patent, is—

1. A filter having, in combination, a filter-chamber substantially filled with sand, a settling-chamber, one or more pipes connecting the bottom of the filtering-chamber with the settling-chamber, said pipe or pipes having an aggregate sectional area so proportioned to the flow of water that the velocity of the water will exceed that necessary to carry particles of sand upward, and each pipe opening freely at the bottom of the settling-chamber, and having at its lower end unobstructed perforations larger than the largest size of sand particles used as a filtering medium, and passages leading from the upper parts of the settling and filtering chambers, all substantially as and for the purpose specified.

2. A filter having, in combination, a filter-chamber substantially filled with sand, a settling-chamber, pipes connecting the bottom of the filtering-chamber with the settling-chamber, said pipes having an aggregate sectional area so proportioned to the flow of water that the velocity of the water will exceed that necessary to carry particles of sand upward, and each pipe opening freely at the bottom of the settling-chamber and having at its lower end perforations larger than the largest size of sand particles used as a filtering medium, ports leading from a valve-chamber into the top of the filtering and settling chambers, a port leading from said valve-chamber to an exit-passage, a supply-pipe, and a valve, whereby the exit-port can be connected with either of the ports leading from the settling and filtering chambers and the water-supply directed through the filter in either direction, all substantially as and for the purpose specified.

3. In combination with a filter, a coagulating device consisting of an enlargement in the supply-pipe of the filter, in combination with a vessel adapted to contain alum solution or the like, a pipe leading from the enlargement aforesaid into said vessel, and a pipe leading from said vessel to a point in the supply-pipe of smaller cross-section than the said enlargement, all substantially as and for the purpose specified.

4. In combination with a filter, a coagulating device consisting of an enlargement in the supply-pipe of the filter, in combination with a vessel adapted to contain alum solution or the like, a pipe leading from the enlargement aforesaid into said vessel, a pipe leading from said vessel to a point in the supply-pipe of smaller cross-section than the said enlargement, and regulator-valves situated in the pipes leading to the vessel, all substantially as and for the purpose specified.

In testimony that I claim the foregoing as my invention I have signed my name in presence of two witnesses.

BARTON HAXALL COFFEY. [L. S.]

Witnesses:
EDWARD P. THOMPSON,
R. W. G. WELLING.